United States Patent
Liu et al.

(10) Patent No.: US 7,330,718 B2
(45) Date of Patent: Feb. 12, 2008

(54) METHOD AND SYSTEM FOR UPDATING SOFTWARE OF A CELLULAR PHONE

(75) Inventors: Li-Sen Liu, Taoyuan (TW); Yu-Chuan Yang, Taipei (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 169 days.

(21) Appl. No.: 10/904,288

(22) Filed: Nov. 2, 2004

(65) Prior Publication Data

US 2006/0046703 A1 Mar. 2, 2006

(30) Foreign Application Priority Data

Aug. 30, 2004 (TW) ............................... 93126060 A

(51) Int. Cl.
*H04M 3/00* (2006.01)
(52) U.S. Cl. ................................. 455/418; 455/412.1
(58) Field of Classification Search ................ 455/418, 455/412.1, 420, 419; 717/173, 170, 171, 717/172, 177, 178, 167, 176; 711/154, 162; 370/338; 709/217; 395/708, 709, 710, 650, 395/700, 712, 653, 200, 600
See application file for complete search history.

(56) References Cited

U.S. PATENT DOCUMENTS

| | | | |
|---|---|---|---|
| 4,954,941 A * | 9/1990 | Redman | ................ 717/162 |
| 6,289,510 B1 | 9/2001 | Nakajima | |
| 6,470,496 B1 * | 10/2002 | Kato et al. | ................ 717/173 |
| 6,496,978 B1 | 12/2002 | Ito | |
| 6,687,901 B1 * | 2/2004 | Imamatsu | ................ 717/173 |
| 6,968,184 B2 * | 11/2005 | Criss et al. | ................ 455/418 |
| 7,168,073 B2 * | 1/2007 | Asano et al. | ................ 717/176 |

FOREIGN PATENT DOCUMENTS

| DE | 195 43 843 | 5/1997 |
|---|---|---|
| EP | 0 901 296 | 3/1999 |

\* cited by examiner

*Primary Examiner*—Naghmeh Mehrpour
(74) *Attorney, Agent, or Firm*—Winston Hsu

(57) ABSTRACT

A method and a system for updating software containing a first program and a first data group. The first program has a corresponding first program version number and the first data group has a corresponding first data group version number. The method includes providing a second program which has a corresponding second program version number; updating the first program using the second program when the value of the first program version number is different from the value of the second program version number; and deciding whether to update the first data group or not according to the updated first program version number of the updated first program.

12 Claims, 3 Drawing Sheets

METHOD AND SYSTEM FOR UPDATING SOFTWARE OF A CELLULAR PHONE

BACKGROUND

The present invention relates to a method and a system for updating software of a cellular phone, and more specifically, to a method and a system for updating software of a cellular phone by comparing data version numbers.

Due to undergoing production, development, maintenance or customer service, a cellular phone manufacturer usually increases or improves functionality of the cellular phone by updating software stored in the cellular phone. In general, the above-mentioned software contains a program and data. A method for updating software according to the related art is to load a required program into the cellular phone, so that the original program in the cellular phone is updated using the required program. In the conventional method, new data are loaded to overwrite all original data stored in the cellular phone. However, the new data are mostly empty data, like a predetermined logical value "1" or "0" that does not record any valid information. Hence, while updating, all the original data is deleted, even some of the original data is totally unrelated to the program update.

In other words, in most cases, most data originally stored in a cellular phone is unrelated to the program update, which means the data unrelated to the program update can be utilized by a new version of the program (the updated program). This data includes, for example, settings/parameters about circuit components of a cellular phone, settings originally inputted by a user and data of a phone book of a cellular phone. Taking settings/parameters about circuit components of a cellular phone as an example, wherein different circuit components may be supplied by different manufacturers. Even for a specific type of circuit component supplied by the same manufacturer, there may be some slight differences between components because of production factors. Hence, before marketing a cellular phone, it is necessary to spend time adjusting all circuit components of the cellular phone to ensure that all circuit components can function properly. In addition, for settings originally inputted into a cellular phone by a user, such as languages utilized in the user interface and data of a phone book, it is undesirable to ask a user to spend more time inputting these original settings into the cellular phone again. Therefore, the above-mentioned original data unrelated to a new version of a program should not to be deleted. In most cases, just little original data needs to be deleted or modified for a new version of the program. However, the conventional software update process always loads all new data that records default values. All original data stored in a cellular phone is replaced. Therefore, it is inconvenient for a user to update the software of a cellular phone by the conventional updating method.

SUMMARY

It is therefore a primary objective of the claimed invention to provide a method and a system for updating software of a cellular phone by comparing data version numbers to solve the above-mentioned problem.

According to the claimed invention, a method applied in an electronic device for updating software of the electronic device is provided. The software contains a first program and a first data group. The first program has a corresponding first program version number and the first data group has a corresponding first data group version number. The method comprises providing a second program which has a corresponding second program version number; updating the first program using the second program when the value of the first program version number is different from the value of the second program version number; and deciding whether to update the first data group or not according to the updated first program version number of the updated first program.

In addition, the claimed invention provides a software update system applied in an electronic device for updating software of the electronic device. The software contains a first program and a first data group. The first program has a corresponding first program version number and the first data group has a corresponding first data group version number. The software update system comprises a second program which has a corresponding second program version number; and an updating module utilized for comparing the first program version number and the second program version number, updating the first program using the second program if the value first program version number is different from the value of the second program version number, and deciding whether to update the first data group or not according to the updated first program version number of the updated first program.

The software update system and the method for updating software according to the present invention prevent data, unrelated to software updating, from being deleted. Therefore, the invention can avoid the time-consuming data resetting or reentering and save much time. For example, a cellular phone does not need additional adjustment to set the parameters of the cellular phone again for each circuit component to operate properly. In addition, a user does not need to input more settings of the cellular phone or insert the phone book of the cellular phone again.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
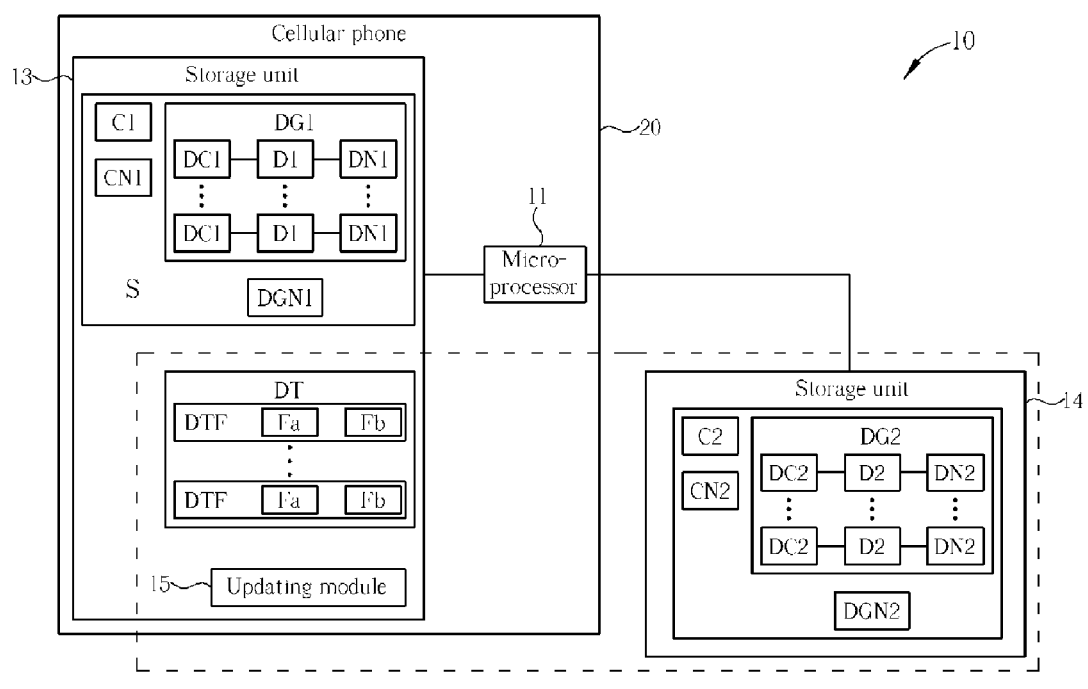
FIG. 1 is a block diagram of a software update system according to the present invention.

Please refer to FIG. 1. FIG. 1 is a block diagram of a software update system 10 according to the present invention. The software update system 10 is applied in an electronic device. In the present embodiment, the electronic device is a cellular phone 20. The cellular phone 20 comprises a micro-processor 11 and a storage unit 13. The micro-processor 11 is electrically connected to the storage unit 13. Software S is stored in the storage unit 13. The software update system 10 according to the present invention is utilized for updating the software S stored in the electronic device 20. The software S comprises a first program C1 and a first data group DG1, wherein the first program C1 has a corresponding first program version number CN1, and the first data group DG1 has a corresponding first data group version number DGN1. The software update system 10 further comprises a second program C2, a second data group DG2 and a updating module 15, wherein the second program C2 has a corresponding second program version number CN2, and the second data group DG2 has a corresponding second data group version number DGN2. The second program C2, the second program version number CN2, the second data group DG2 and the second data group version number DGN2 are stored in a storage unit 14 outside the cellular phone 20. In the present embodiment, the micro-processor 11 is coupled to the storage unit 14 via network communication or through circuits. Hence, it can access data stored in the storage unit 14. The first data group DG1 comprises a plurality of first data sets D1, and each first data set D1 has a corresponding first data set code DC1 and a corresponding first data set version number DN1. The second data group DG2 comprises a plurality of second data sets D2, and each second data set D2 has a corresponding second data set code DC2 and a corresponding second data set version number DN2. In the present embodiment, the first data group DG1 comprises N first data sets D1 and the second data group DG2 comprises N second data sets D2. In addition, the first program C1 and the second program C2 both are executable files.

The updating module 15 is stored in the storage unit 13 for comparing the first program version number CN1 and the second program version number CN2. If the value of the first program version number CN1 is different from the value of the second program version number CN2, the updating module 15 updates the first program C1 using the second program C2. Then, when rebooting the cellular phone 20, the updating module 15 compares the updated first program version number CN1 and the first data group version number DGN1. If the updated first program version number CN1 is different from the value of the first data group version number DGN1, the updating module 15 updates the first data group DG1 using the second data group DG2.

When the updating module 15 updates the first program C1 using the second program C2, the updating module 15 updates a data update table DT. When rebooting the cellular phone 20, the updating module 15 updates the first data group DG1 according to the data update table DT.

The data update table DT is stored in the storage unit 13, comprising a plurality of updating fields DTF. Each updating field DTF corresponds to a first data set D1 and comprises sub-fields Fa and Fb. For a first data set D1, a sub-field Fa records a first data set code DC1 corresponding to the first data set D1, and a sub-field Fb records a first data set version number DN1 corresponding to the first data set D1. When the updating module 15 updates the first program C1 using the second program C2, the updating module 15 updates the data update table DT according to the versions of data sets utilized by the second program C2. In the other words, if some first data set D1 utilized by the first program C1 cannot be utilized by the second program C2, the updating module 15 must update the first data set D1 using a corresponding second data set D2 in a following data update operation, wherein the second data set D2 corresponding to the first data set D1 is utilized by the second program C2. Because the first data set D1 cannot be utilized by the second program C2, the first data set version number DN1 of the first data set D1 is different from the second data set version number DN2 of the second data set D2 corresponding to the first data set D1.

Therefore, during a process in which the updating module 15 updates the first program C1 using the second program C2, if some first data set D1 cannot be utilized by the second program C2, the updating module 15 updates the above-mentioned data update table DT, and moreover, a first data set version number DN1 originally stored in the data update table DT is updated using a second data set version number DN2 of a second data set D2 corresponding to the updated first data set D1.

It should be noted that data groups, such as the first data group DG1 and the second data group DG2, can be utilized for recording luminance settings of a liquid crystal display (LCD), settings of a user interface, a battery or radio frequency (RF) setting of the cellular phone 20 or information inputted into the cellular phone 20 by a user. Each of the settings is recorded using a parameter or a set of parameters, such as a first data set D1 or a first data group DG1 respectively, in the present embodiment.

Figure 2:
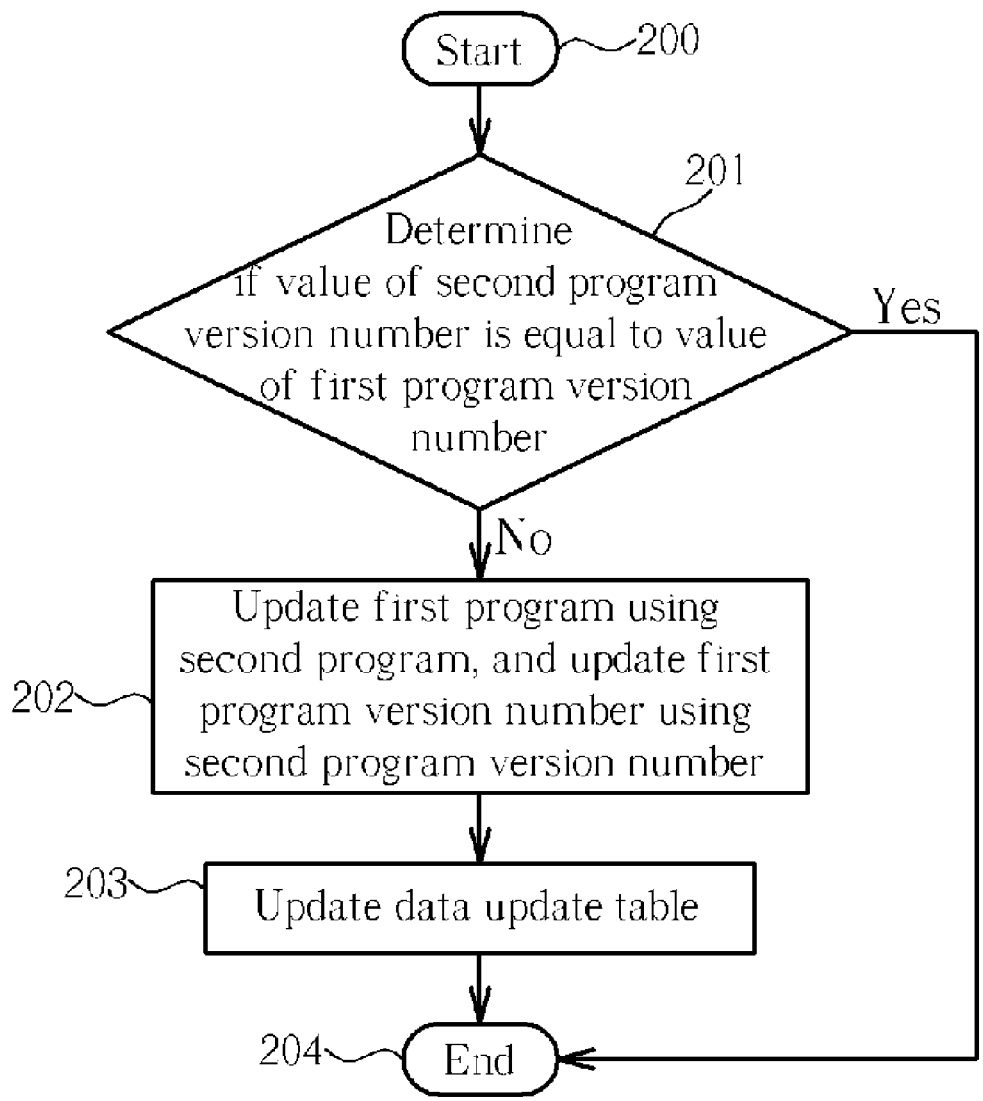
FIG. 2 is a flowchart illustrating a first stage of a software update performed by the software update system shown in FIG. 1.
Figure 3:
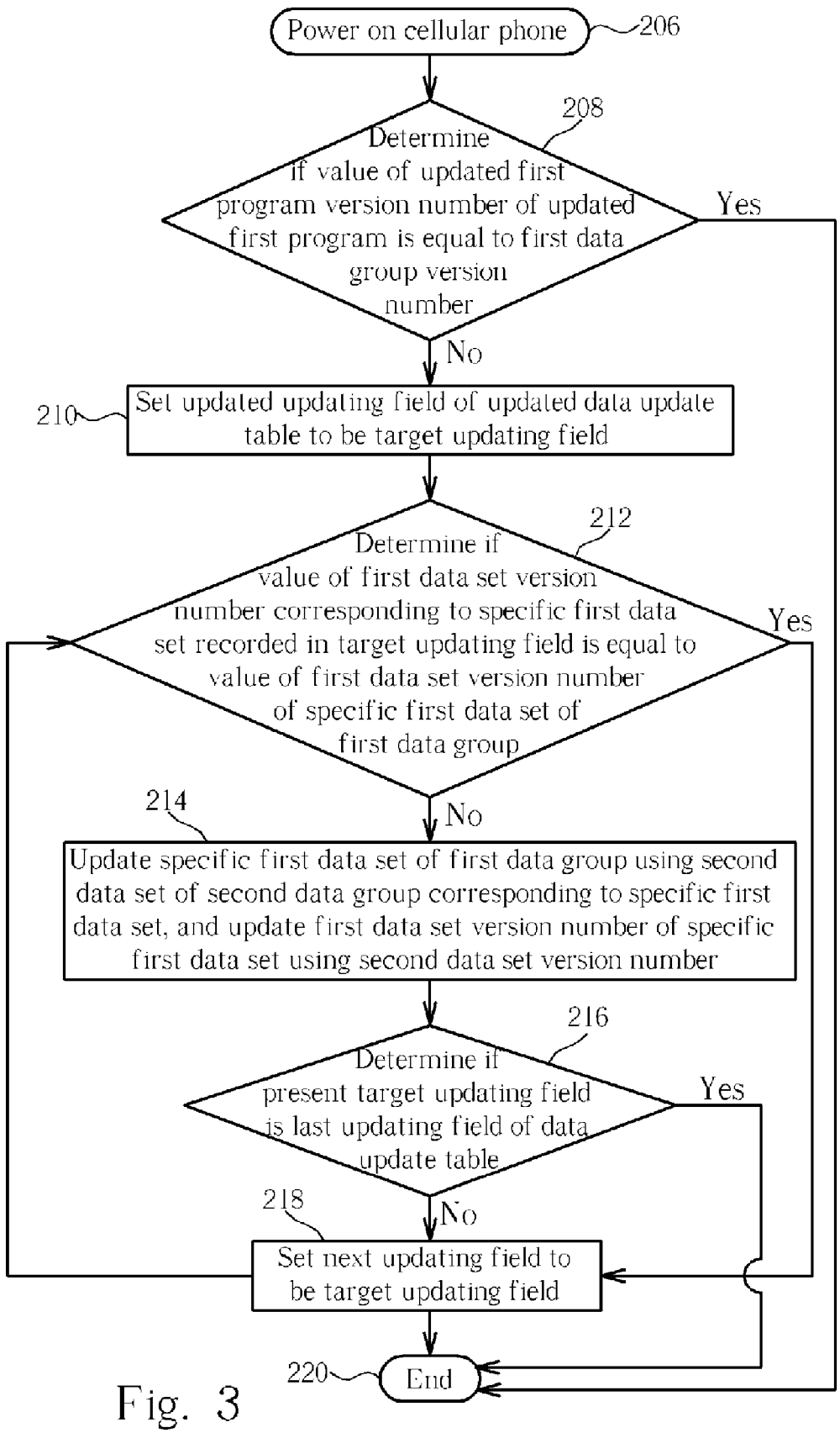
FIG. 3 is a flowchart illustrating a second stage of a software update performed by the software update system shown in FIG. 1.

Please refer to FIG. 1, FIG. 2 and FIG. 3. In the present embodiment, the software update operation contains two stages, a first stage and a second stage. FIG. 2 is a flowchart illustrating the first stage of the software update performed by the software update system 10 shown in FIG. 1. FIG. 3 is a flowchart illustrating the second stage of the software update performed by the software update system 10 shown in FIG. 1. The first stage contains the following steps:

Step 200: Start.

Step 201: Determine if the value of the second program version number CN2 is equal to the value of the first program version number CN1. If yes, go to step 204; otherwise, go to step 202.

Step 202: Update the first program C1 using the second program C2, and update the first program version number CN1 using the second program version number CN2.

Step 203: Update the data update table DT.

Step 204: End.

The second stage contains the following steps:

Step 206: Power on the cellular phone 20.

Step 208: Determine if the value of the updated first program version number CN1 of the updated first program C1 is equal to the first data group version number DGN1. If yes, go to step 220; otherwise, go to step 210.

Step 210: Set an updated updating field DTF of the updated data update table DT to be a target updating field DTF.

Step 212: Determine if the value of the first data set version number DN1 corresponding to a specific first data set D1 recorded in the target updating field DTF is equal to the value of the first data set version number DN1 of the specific first data set D1 of the first data group DG1. If yes, go to step 218; otherwise, go to step 214.

Step 214: Update the specific first data set D1 of the first data group DG1 using the second data set D2 of the second data group DG2 corresponding to the specific first data set D1, and update the first data set version number DN1 of the specific first data set D1 using the second data set version number DN2.

Step 216: Determine if the present target updating field DTF is the last updating field DTF of the data update table DT. If yes, go to step 220; otherwise, go to step 218.

Step 218: Set a next updating field DTF to be a target updating field DTF, and then go to Step 212.

Step 220: End.

The operation of the software update executed by the software update system 10 is described as follows. In the first stage, the micro-processor 11 reads the updating module 15 stored in the storage unit 13 and then executes the updating module 15 (step 201). Next, the updating module 15 determines if the value of the second program version number CN2 is equal to the first program version number CN1 (step 201). If yes, the software update system 10 ends the software update because the determined result means that the second program C2 is the first program C1. Otherwise, if the value of the second program version number CN2 is different from the value of the first program version number CN1, the updating module 15 updates the first program C1 using the second program C2, and updates the first program version number CN1 with the second program version number CN2. Therefore, now the updated first program C1 and the updated first program version number CN1 stored in the storage unit 13 respectively are the second program C2 and the second program version number CN2 (step 202). Next, the updating module 15 updates the data update table DT according to the data versions utilized by the updated first program C1 (the second program C2) (step 203).

Please note that in the first stage, if the value of the second program version number CN2 is equal to the value of the first program version number CN1, the software update system 10 will not execute updating the first program C1. Therefore, in the second stage, the result in step 208 (detailed description is in the following paragraph) will be yes, which means that the value of the first program version number CN1 is equal to the value of the first data group version number DGN1, and the software update system 10 ends the second stage of the software update.

Afterwards, when rebooting the cellular phone 20, the micro-processor 11 reads the updating module 15 stored in the storage unit 13 and then executes the updating module 15. The software update system 10 executes the second stage of the operation of software update (step 206). The updating module 15 determines if the value of the updated first program version number CN1 (which is the second program version number CN2 now) is equal to the value of the first data group version number DGN1 (step 208). If yes, the software update system 10 ends the software update. However, if the result in step 208 is no, which means the first program C1 has been updated using the second program C2, some first data set(s) D1 of the first data group DG1 must be updated using the corresponding second data sets D2. In other words, the first data group DG1 must be updated using the second data group DG2 to be utilized by the second program C2. Hence, the updating module 15 sets an updated updating field DTF of the updated data update table DT to be a target updating field DTF (step 210). Afterwards, the updating module 15 determines if the value of the first data set version number DN1 corresponding to a specific first data set D1 recorded in the target updating field DTF is equal to the value of the first data set version number DN1 of the specific first data set D1 of the first data group DG1 (step 212). If the result in step 212 is no, the updating module 15 updates the specific first data set D1 of the first data group DG1 using the second data set D2 of the second data group DG2 corresponding to the specific first data set D1, and updates the first data set version number DN1 of the specific first data set D1 using the second data set version number DN2 (step 214). If the result in step 212 is yes, the software update system 10 executes step 218, described in the next paragraph.

After finishing executing step 214, the updating module 15 determines if the present target updating field DTF is the last updating field DTF of the data update table DT (step 216). If the result in step 216 is yes, the software update system 10 ends the software update. If the result in step 216 is no, the software update system 10 executes step 218, in which the updating module 15 sets a next updating field DTF to be a target updating field DTF. After finishing executing step 218, the software update system 10 goes back to execute step 212.

The software update system and the method for updating software according to the present invention are primarily applied in a mobile unit, such as a cellular phone, to ensure that updating a software of a cellular phone will not result in any inconvenience to a user. However, the software update system and the method for updating software according to the present invention are not limited in the above-mentioned application(s).

In contrast to the related art, the software update system and the method for updating software according to the present invention ensure that data unrelated to software updating will not be deleted. Therefore, the time-consuming data resetting and reentering can be avoided and time can be saved. Hence, for example, a cellular phone does not need additional adjustment to reset the parameters of the cellular phone for each circuit component to operate properly. In addition, a user does not need to input the settings of the cellular phone and insert the phone book of the cellular phone again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method applied in an electronic device for updating a software of the electronic device; the software containing a first program and a first data group; the first program having a corresponding first program version number, and the first data group having a corresponding first data group version number, the method comprising:
   downloading a second program having a corresponding second program version number;
   updating the first program using the second program when the value of the first program version number is different from the value of the second program version number;
   downloading a second data group corresponding to the first data group; and
   after downloading the second data group, determining if the value of the second program version number equals the value of the first data group version number and updating the first data group using the second data group only when the value of the second program version number does not equal the value of first data group version number;
   wherein the first program is independent of the first data group.

2. The method of claim 1, wherein:
   the first data group comprises a plurality of first data sets, and each first data set has a corresponding first data set code and a corresponding first data set version number;
   the second data group comprises a plurality of second data sets, and each second data set has a corresponding second data set code and a corresponding second data set version number;
   wherein, each first data set corresponds to a second data set; and
   when updating the first data group using the second data group the method further comprises:
   for each first data set of the plurality of first data sets, when the value of the corresponding second data set version number does not equal the value of the corresponding said first data set version number, updating said first data set using the corresponding second data set, and when the value of the corresponding second data set version number equals the value of the corresponding said first data set version number, not updating said first data set using the corresponding second data set.

3. The method of claim 2, wherein a data update table stored in the electronic device comprises a plurality of updating fields, and each updating field corresponds to one of said first data set for recording a first data set code and the corresponding first data set version number of said first data set and the method further comprises: in the step of updating the first data group using the second data group, the step is executed according to the updated data update table.

4. The method of claim 1, wherein the electronic device is a mobile unit.

5. A software update system applied in an electronic device for updating a software of the electronic device; the software containing a first program and a first data group; the first program having a corresponding first program version number, and the first data group having a corresponding first data group version number, the software update system comprising:
   a second program having a corresponding second program version number;
   a second data group having a corresponding second data group version number; and
   an updating module utilized for comparing the first program version number and the second program version number, updating the first program using the second program if the value of the first program version number is different from the value of the second program version number, and for determining if the value of the second program version number equals the value of first data group version number and updating the first data group using the second data group only when the value of the second program version number does not equal the value of first data group version number;
   wherein the first program is independent of the first data group.

6. The software update system of claim 5, wherein:
   the first program, the first program version number, the first data group and the first data group version number are stored in a first storage unit; and
   the second program, the second program version number, the second data group and the second data group version number are stored in a second storage unit.

7. The software update system of claim 5, wherein:
   the first data group comprises a plurality of first data sets, and each first data set has a corresponding first data set code and a corresponding first data set version number;
   the second data group comprises a plurality of second data sets, and each second data set has a corresponding second data set code and a corresponding second data set version number;
   wherein, each first data set corresponds to a second data set; and
   when the updating module updates the first data group using the second data group, for each first data set of the plurality of first data sets, when the value of the corresponding second data set version number does not equal the value of the corresponding said first data set version number, the updating module updates said first data set using the corresponding second data set, and when the value of the corresponding second data set version number equals the value of the corresponding said first data set version number, the updating module does not update said first data set using the corresponding second data set.

8. The software update system of claim 7, further comprises a data update table stored in the electronic device, the data update table comprising a plurality of updating fields, and each updating field corresponds to one of said first data sets for recording a first data set code and the corresponding first data set version number of said first data set;
   wherein the updating module updates the first data group using the second data group according to the updated data update table.

9. The software update system of claim 5, wherein the electronic device is a mobile unit.

10. A method applied in an electronic device for updating a software of the electronic device; the software containing a first program and a plurality of first data sets independent of the first program; the first program having a first program version number, and each first data set having a first data set version number, the method comprising:
   downloading a second program having a second program version number;
   downloading a plurality of second data sets, each second data set having a second data set version number, and each second data set corresponding to a first data set;
   updating the first program using the second program when the value of the first program version number is different from the value of the second program version number; and
   after downloading the plurality of second data sets, for each data set in the plurality of first data sets, determining if the value of the first data set version number of the first data set equals the value of the second data set version number of the second data set and updating the first data set using the corresponding second data set only when the value of the first data set version number of the first data set is different from the value of the second data set version number of the second data set and not updating the first data set using the corresponding second data set when the value of the first data set version number of the first data set is the same as the value of the second data set version number of the second data set.

11. The method of claim 10, wherein at least one of said each first data set comprises vendor specific setting required by a circuit component of the electronic device for proper functionality.

12. The method of claim 2, wherein at least one of said each first data set comprises vendor specific setting required by a circuit component of the electronic device for proper functionality.

* * * * *